Figure 5:
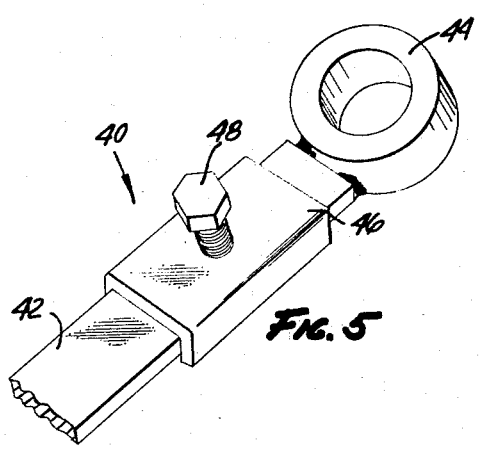

Dec. 20, 1966      P. D. RIGTERINK      3,292,586
FEED-RETURN APPARATUS FOR AUTOMATIC FEEDING CONVEYORS
Filed May 17, 1965      2 Sheets-Sheet 1
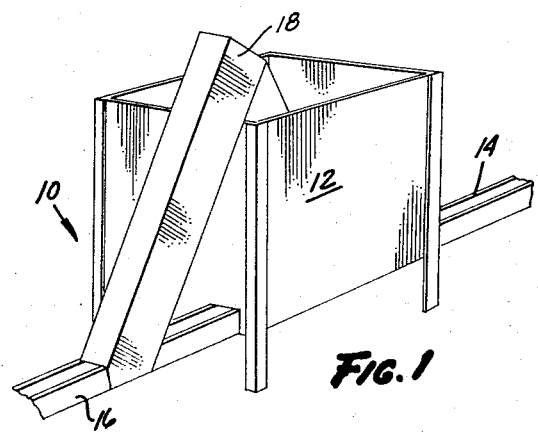
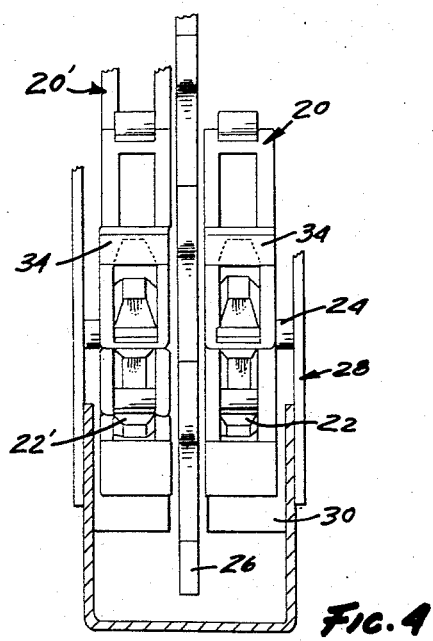
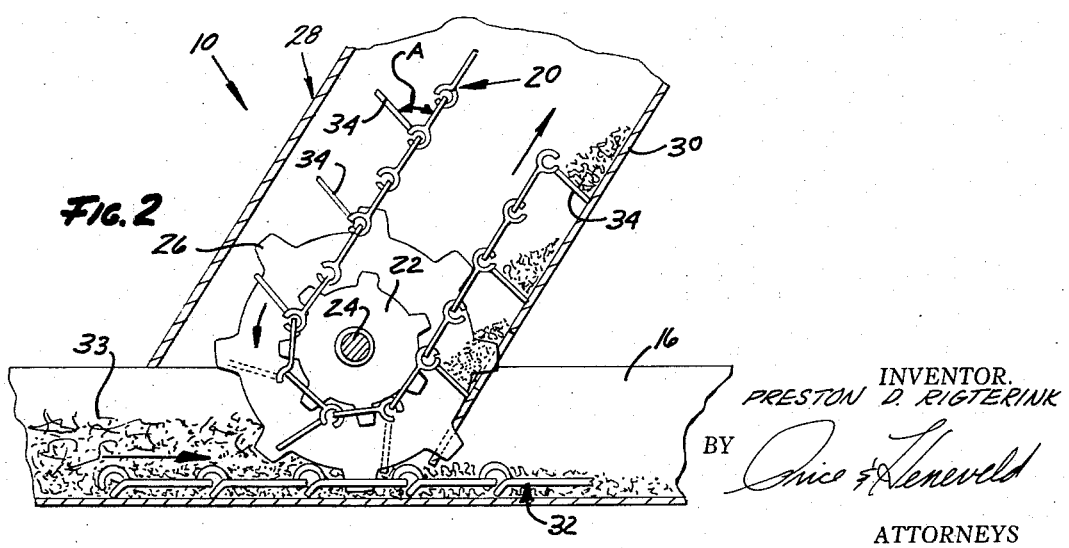
INVENTOR.
PRESTON D. RIGTERINK
BY
ATTORNEYS Dec. 20, 1966  P. D. RIGTERINK  3,292,586
FEED-RETURN APPARATUS FOR AUTOMATIC FEEDING CONVEYORS
Filed May 17, 1965  2 Sheets-Sheet 2

INVENTOR.
PRESTON D. RIGTERINK
BY
ATTORNEYS

United States Patent Office 3,292,586
Patented Dec. 20, 1966

3,292,586
FEED-RETURN APPARATUS FOR AUTOMATIC FEEDING CONVEYORS
Preston D. Rigterink, Holland, Mich., assignor to Big Dutchman, Inc., Zeeland, Mich., a corporation of Michigan
Filed May 17, 1965, Ser. No. 456,427
21 Claims. (Cl. 119—52)

This invention relates to automatic feeding equipment, and more particularly to an inventive new feed-return apparatus for removing excess feed from the return trough of such equipment and depositing this feed back into the supply hopper.

Automatic feeding apparatus for poultry and various domestic animals has of course long been known. Typically, such equipment includes a supply hopper for storing a quantity of feed to be used, and at least one continuous trough passes through the bottom of the hopper to receive feed therefrom. The trough traces a closed path having a predetermined overall length and configuration, over which the creatures being fed may position themselves to take feed from the trough. A conveying member of a desired nature operates within the trough to constantly move feed from the hopper throughout the length of the trough, thereby providing fresh quantities of feed continuously.

A recurrent problem involved in the use of such equipment concerns the re-entry of feed into the hopper from the trough at the point where the latter returns to the hopper and passes into it. Since the eating habits of the poultry or animals vary periodically through the day and from day to day, and since also the number feeding may change from time to time, at times the return trough carries very little feed in it, whereas at other times it may return to the hopper comparatively full. In the latter instance, if no other measures are taken, the feed very soon begins to pile up at the return inlet of the hopper and to spill over out of the hopper and onto the floor. This obviously creates an undesirable situation, since it can waste great quantities of feed and to some degree at least tend to defeat the basic purpose of automatic feeding equipment.

Various devices have been suggested in the past for overcoming this difficulty, but all such mechanisms have presented limitations of their own of one form or another. Thus, some required the user to purchase an entire new set of equipment since they could not be incorporated into existing mechanisms. Others failed to have the required feed-handling capacity, and still others subject to stoppages or jamming due to the characteristics and the quantity of the feed which they were required to handle. Other mechanisms, such as that disclosed in U.S. Patent No. 2,742,020 and assigned to the assignee of the present invention, operate satisfactorily in and of themselves but require a considerable amount of floor space adjacent the troughs and consequently cannot be utilized with multiple troughs positioned closely adjacent each other, such as in a system of the type illustrated in U.S. Patent No. 2,742,139 for example. Also, feed-return mechanisms of this type require modification of existing feeding equipment and so are not attractive except in cases of original equipment specifically manufactured to cooperate therewith.

Accordingly, it is a major object of the present invention to provide a feed-return apparatus which has an inherent capacity for handling more feed than the feeding equipment can present to it, and which may be used with equal facility upon both newly designed equipment and upon older equipment already in existence.

Another object of the present invention is to provide a feed-return apparatus having the foregoing features which requires practically no modification of existing feeding equipment in order to incorporate it thereupon.

Still another object of the present invention is to provide a feed-return apparatus having the foregoing desirable characteristics and which further requires no more lateral mounting space than that of the feed trough itself, and which consequently may be used with complete facility upon each trough in a multiple trough feeding system. A further object of the present invention is to provide a feed-return apparatus having the foregoing characteristics and which further needs no separate source of motive power, but cooperates uniquely with the feeding equipment and is completely powered thereby.

A still further object of the present invention is to provide a feed-return apparatus having all of the foregoing characteristics, and which further mounts directly upon the return trough and communicates directly with the feed being moved therein.

The foregoing objects and advantages of the present invention, together with many other equally desirable attributes and features thereof, will become increasingly apparent following consideration of the ensuing specification and its appended claims, particularly when taken in conjunction with the accompanying illustrative drawings setting forth a preferred embodiment thereof.

Figure 6:
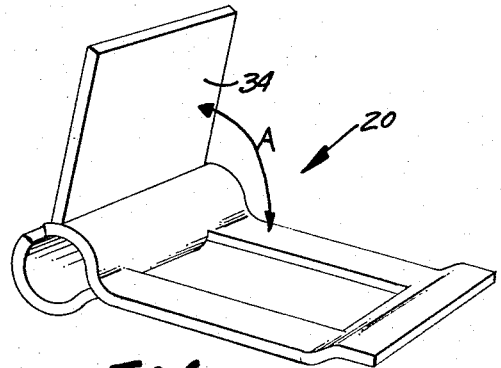
Figure 3:
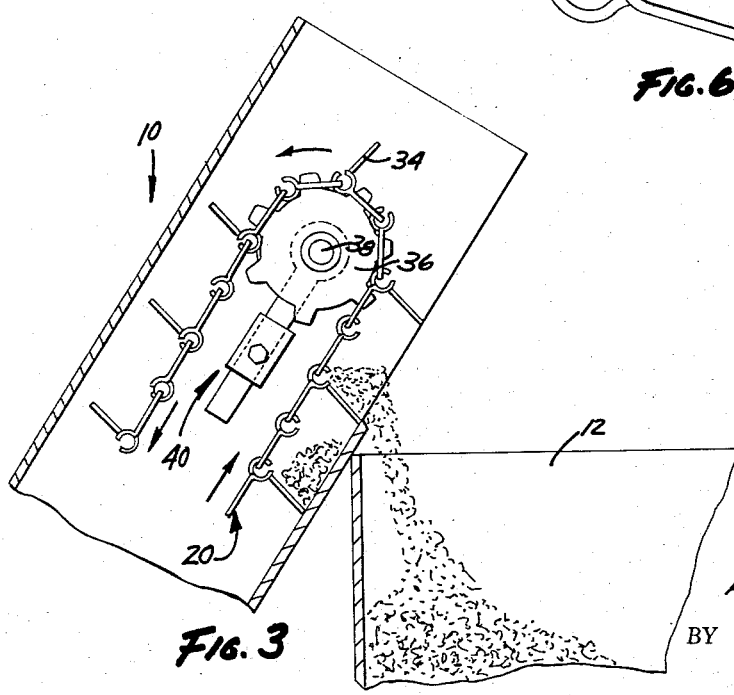

In the drawings:
FIG. 1 is a frontal perspective view showing the novel feed-return apparatus installed upon an illustrative automated feeding mechanism;
FIG. 2 is an enlarged central sectional view of the lower portion of the return apparatus and feeder trough, showing various details thereof;
FIG. 3 is an enlarged central sectional view of the upper portion of the return apparatus and the hopper, showing specific details thereof;
FIG. 4 is an enlarged front elevation of the lower portion of the return apparatus and trough;
FIG. 5 is an enlarged perspective view of a specific structure used in the preferred embodiment of the return apparatus illustrated herein; and
FIG. 6 is an enlarged perspective view of one of the links of the feed-return chain used in the novel apparatus.

Briefly stated, the present invention provides a novel apparatus for transferring feed from the return trough into the supply hopper of automated feeding equipment. The apparatus includes a conveying means which is secured to and which communicates with the return trough, and which inclines upwardly therefrom to the upper extremity of the hopper. The conveying means is comprised basically of an endless movable member having a series of flight means secured thereto for movement therewith. The flight means extend outwardly away from the member, and occupy a position aligned directly over the return trough. The lower portion of the conveying means includes a sprocket which engages the chain or other equivalent structure which moves the feed within the trough, and the sprocket is driven in a rotary manner thereby. This causes the conveying means movable member to be driven, resulting in the flight means being moved lengthwise through a portion of the trough at a speed that is greater than the speed with which the feed is being moved through the trough. Consequently, the flight means gather feed from the trough, and the conveying means operates to carry the gathered feed upward until at or near the top of its run the feed drops away from the conveyor and is deposited into the top of the hopper.

Referring now in more detail to the drawings, in FIG. 1 the novel feed-return apparatus is indicated generally at 10, where it is seen installed upon an exemplary automated feeding system. The latter includes a supply hopper 12, a feed trough 14 leaving the hopper, and a feed trough 16 returning to the hopper, it being understood that in actuality the feed troughs 14 and 16 are the ends of a continuous member tracing a closed path to and from the hopper. As is well known, an endless moving conveyor member such as a chain travels through the trough to distribute feed throughout its length. It will be noted in this figure that the feed-return apparatus 10 includes a structure which attaches to the return trough 16 a brief distance away from the actual point of entry of the trough into the hopper and inclines upwardly toward the hopper to extend over its top extremity. The upper extremity of the return apparatus includes a chute means 18 through which feed being returned to the hopper by the apparatus 10 is directed into the interior of the hopper in a desired manner.

As the sectional elevation of FIG. 2 illustrates, the feed-return apparatus 10 includes a conveyor means for transferring excess feed from the trough 16 upward toward the chute means 18 at the top of the return apparatus. This conveying means comprises an endless movable member 20 which preferably is a chain composed of flat links. These links have the shape indicated generally in this figure, and they are further illustrated in perspective in FIG. 6. The chain member 20 is entrained at its bottom about a chain drive sprocket 22 having appropriate gear teeth for engaging the separate links of chain. Chain drive sprocket 22 is rotatably mounted about a central support shaft 24, which also extends through and supports a larger sprocket wheel 26 which is located adjacent chain drive sprocket 22 and secured for rotation in unison therewith.

This arrangement is further illustrated in FIG. 4, where it will be observed that in the preferred embodiment herein illustrated, the conveying means in fact includes a pair of identical chain conveyor members 20 and 20', respectively which are entrained over identical drive sprockets 22 and 22', respectively, mounted on either side of the larger sprocket 26. It will be noted from both FIGS. 2 and 4 that the conveying apparatus is substantially enclosed within a housing structure 28. This is basically a channel-shaped member formed from sheet metal or the like, having a flat bottom or floor portion 30 (FIG. 2) and a cover plate (see FIG. 1) for completely enclosing the conveying means therewithin. The opposite walls of the housing structure 28 support the sprocket shaft 24 in appropriate journals formed therethrough, as is illustrated in FIG. 4.

As FIG. 2 illustrates, the return trough 16 has a generally flat conveyor chain 32 near its bottom, by which the environmental automated feeding apparatus is operated. As illustrated at 33 in this figure, a quantity of feed is being returned to the hopper by the chain 32, which moves from left to right of the figure. The teeth of the central sprocket 26 are engaged by each successive link in chain 32, and consequently as the feed chain 32 is moved from left to right, the sprocket 26 is rotated in a counterclockwise direction. Inasmuch as the chain drive sprockets 22 and 22' are secured for movement with sprocket 26, these chain drive sprockets are also driven in a counterclockwise direction, and this serves to drive the conveying chains 20 and 20' of the feed-return apparatus in the manner indicated by the arrows.

It will particularly be noted that the feed-return conveyor chain 20 carries a regular succession of flight means 34, which in the embodiment illustrated are secured to alternate links in the chain. The flight means 34 are seen clearly in FIGS. 2, 3, 4, and 5, and comprise a generally flat blade having a flat and linear outer tip. An important feature lies in the fact that each of the blades 34 is secured to its appropriate link in chain 20 at a uniform angle away from the direction of motion of the chain. This angle is designated A (FIGS. 2 and 6), and it should be somewhat less than a right angle and preferably on the order of about seventy-five degress. In this configuration, the flat tip of the blades is rotated around sprocket 22 (see FIG. 2) and into position adjacent the bottom member 30 of the housing structure 28 surrounding the lower portion of the conveying apparatus. The flight means are thus positioned more nearly in an absolute vertical plane than would be the case if angle A were 90 degrees, in which case the flights would be perpendicular to bottom portion 30. The purpose of the flight orientation will appear subsequently.

The upper end of the return apparatus 10 is illustrated in FIG. 3. It will here be seen that the feed-return conveyor chain 20 is entrained at its upper end about an idler sprocket 36. Idler sprocket 36 is substantially identical in configuration to chain drive sprocket 22, and also is mounted between opposite side walls of the housing structure 28 upon a central support shaft, designated 38. Although it is not specifically shown, it will be understood that the companion chain 20' of FIG. 4 is entrained about a companion idler sprocket, and that consequently both chains are supported in an identical adjacent position for movement about shaft 38.

Unlike the shaft 24 for sprockets 22 and 22' at the bottom of the return apparatus, the shaft 38 at the top of the apparatus is preferably not fixedly journaled directly in the walls of the housing structure 28. Instead, the mounting apparatus indicated generally at 40 in FIG. 3 is utilized. Mounting apparatus 40 is shown in more detail in FIG. 5, where it is seen that basically this apparatus includes an elongate support bar 42 having an annular bearing means 44 secured to its upper end, and a generally channel-shaped bracket 46 having a threaded aperture therein through which an adjusting bolt 48 passes to bear against the support bar 42.

A pair of the mounting apparatus 40 are used in supporting the idler sprocket shaft 38 and the idler sprockets 36 at the upper extremity of the feed-return apparatus. Such mounting apparatus serve to retain the idler sprockets in a desired position which maintains the feed-return conveyor chain 20 under a desired degree of tension. In accomplishing this, each of the brackets 46 are fixedly secured to opposite side wall portions of the housing structure 28, as by welding, in the position shown in FIG. 3. The support bars 42 of the mounting apparatus are then slid into the opening between the housing wall and the bracket. The idler support shaft 38 is journaled at each of its outer ends in the bearing means 44 at the top of the support bars, with the idler sprockets 36 mounted on the shaft and positioned between the two bearing means 44. With the chain 20 properly entrained over the idler sprockets, the sprockets and their support shaft are raised within housing 28 until the chain is properly tightened, and in this position the adjusting bolts 48 are tightened to bring the support bars 42 into bearing relation against the sides of the housing structure and lock the idler sprockets and their support shaft firmly into position. Readjustments are readily achieved by merely loosening the adjusting bolts 48 and repositioning the sprockets and shaft by moving the support bars 42 upward or downward, as may be desired.

Having now set forth in detail a preferred structural embodiment of the present feed-return apparatus, and having indicated the assembly of this structure, its feed return operation will be apparent. As the main conveyor chain 32 moves within the trough 14, 16 of the environmental automated feeding apparatus, it will from time to time return a significant quantity of feed 33 (FIG. 2) back toward the hopper 12. The engagement of the main conveyor chain 32 with the lower sprocket 26 of the feed-return apparatus causes the sprocket 26 to turn counterclockwise, thereby driving the lower feed-return drive sprockets 22, 22' in a similar manner. This drives the feed-return conveyor chain 20 accordingly, and causes its attached flight means 34 to be driven or swept lengthwise through the associated portion of feed-return trough 16.

The rotational radii of sprocket 26 is greater than that of drive sprockets 22, 22', but approximately the same as that of the tips of the flight means 34 consequently, the tangential velocity of the tips of the flight means as the same are moved around the bottom of their drive sprockets is approximtaely the same as the linear velocity of the main conveyor chain 32 and the feed 33 being moved thereby. However, as the moving feed encounters the lowermost extremity of the housing structure bottom 30, it is accumulated thereby in front of this extremity and directly in the path of the flight means as they move around their drive sprockets and sweep through the trough 16 toward the bottom 30. Since the flight means move through this accumulated feed with appreciable relative velocity, each successive flight means blade 34 gathers or scoops up a quantity of the accumulated feed, and moves this quantity of feed upward directly onto the bottom 30 of the housing structure 28, where the feed is entrapped due to the channel-shaped housing structure and the cooperating flight blade. This reduces the quantity of feed being moved by the main conveyor chain 32 from the level shown at the left of the feed-return apparatus 10 to that shown at the right, so that only a relatively small amount of feed remains to be moved by the chain 32 into the supply hopper 12.

Consequently, the amount of feed returned to the hopper is so small that there can be no build up within the return trough as it enters the hopper, and no feed is allowed to spill out of the return trough. The feed which has been gathered by each of the flight blades 34 and entrapped within the housing structure 28 is continuously moved by the moving blades upward upon the floor portion 30 of the housing (see FIGS. 2 and 3) until it reaches the upper extremity of the housing, where the floor 30 ceases or has an opening formed therein. At this point, the feed drops vertically away from the flight blades, and falls directly into the hopper 12. To facilitate the proper discharge of the feed into the hopper, a spout or chute may be utilized at the top of the feed-return apparatus, as is indicated at 18 in FIG. 1.

It is at the upper extremity of the feed-return apparatus, where the feed drops away from the flight blade and into the hopper, that the angle relationship previously specified for the preferred embodiment of the apparatus becomes quite important. The feed which is used in the automated feeding equipment is often a finely-milled product which tends to be somewhat cohesive and easily compacted, and it also is somewhat adhesive and will adhere in small deposits to most surfaces with which it comes into contact. In the continuous operation envisioned for the present feed-return apparatus, there would be a tendency for the feed to remain in contact with each of the flight blades if the same were positioned more or less perpendicular to the bottom 30 of the housing structure, since in this case the force of gravity acting upon the feed would not only influence it to drop downward into the hopper, but would also have a horizontal component which would tend to cause the feed to remain in place upon the face of the flight blades. Feed which did remain upon the flight blades would be carried directly around the idler sprockets 36 at the top of the return apparatus, and then it would either fall or be carried back down the upper portion of the chain 20, to join the feed 33 which is just nearing the feed return. This naturally would adversely effect the operation of the feed return and would diminish its feed-handling efficiency. In contrast to this, it will be observed that the preferred angle for the flight blades places them in a position that is more nearly vertical relative to the hopper (see FIG. 3), and this virtually eliminates the described problem, since the feed then is almost entirely free to drop away from the flight blades the moment they reach the top of the enclosure structure.

It will be apparent to those skilled in the art pertaining to this invention that the invention provides a novel form of feed return which may quickly and readily be installed upon existing equipment, and which does not require even minor modification of the existing equipment. The present feed-return apparatus has many novel features and very desirable operating characteristics, since it communicates directly with the feed in the return trough and by its inherent design can handle even the greatest quantities of feed that can possibly remain in the return trough as it nears the hopper. Thus, the typical pile-up of feed at the hopper inlet, and the consequent spilling over and wasting of feed, is entirely eliminated. Further, it will be noted that the side portions of the feed-return apparatus are smooth and unbroken by any protruding structures, and that these sides are practically no wider than the width of the feeder trough itself. Consequently, the novel feed-return apparatus requires only the same lateral mounting space as the feeder troughs, and a separate return apparatus may be used on even closely adjacent troughs in multiple-trough feeding systems. The value and significance of this advance will clearly be apparent to those skilled in this art.

While a preferred embodiment of the invention has been shown and described throughout this specification, it will be apparent that various other embodiments of the concept underlying the invention, as well as various modifications and variations of the embodiment shown herein, are possible without departing from the spirit of the invention. Consequently, all such embodiments, variations, and modifications are to be considered as within the scope of the claims appended below, unless these claims by their language expressly state otherwise.

I claim:

1. Animal feed return apparatus for transferring feed from the return trough into the supply hopper of automated animal feeding apparatus including a conveyor chain for moving feed through the trough, comprising in combination: a conveying means inclined upwardly from said trough to the upper extremity of said hopper; said conveying means having an endless movable member and a series of flight means secured to said member for movement therewith; said flight means extending outwardly from said member and aligned over said trough, and having a portion extending into said trough to be moved therewithin; said conveying means including a chain engaging sprocket assembly at the lower portion of said endless movable member and comprising a central drive sprocket and at least one adjacent chain drive sprocket, said central drive sprocket constituting a means for receiving motion from the conveyor chain and transferring it to the endless movable member through said adjacent chain drive sprocket, said flight means when moved within said trough gathering feed therefrom; and said conveying means then carrying the gathered feed upward to deposit same into the said hopper.

2. The apparatus of claim 1, wherein said apparatus has a total width substantially the same as that of said trough, and further is substantially devoid of any structure projecting laterally therefrom beyond said width.

3. Animal feed return apparatus for transferring feed from the return trough into the supply hopper of automated animal feeding apparatus including a conveyor chain for moving feed through the trough, comprising in combination: a conveying means inclined upwardly from said trough to the upper extremity of said hopper; said conveying means having an endless movable member and a series of flight means secured to said member for movement therewith; said flight means extending outwardly from said member and aligned over said trough, and having a portion extending into said trough to be moved therewithin; said conveying means including a chain engaging sprocket assembly at the lower portion of said endless movable member and comprising a central drive sprocket and at least one adjacent chain drive sprocket, said central drive sprocket constituting a means for receiving motion from the conveyor chain and transferring it to the endless movable member through said adjacent chain drive sprocket, the flight means passing lengthwise through the said trough at a speed greater than at least some of the feed therein; said flight means when so moved within said trough gathering feed therefrom; and said conveying means then carrying the gathered feed upward to deposit same into the said hopper.

4. The apparatus of claim 3, wherein said means for driving the movable member and flight means includes: a first rotary member engageable with and driven by the automated apparatus which moves feed in the troughs; a second rotary member secured relative to said first rotary member for rotation in unison therewith and having a smaller rotational radius than the first member; and said movable conveying member operatively engaged with said second rotary member to be moved thereby.

5. The apparatus of claim 4, wherein said apparatus has a total width substantially the same as that of said trough, and further is substantially devoid of any structure projecting laterally therefrom beyond said width.

6. Animal feed return apparatus for transferring feed from the return trough into the supply hopper of automated animal feeding apparatus including a conveyor chain for moving feed through the trough, comprising in combination: a conveying means inclined upwardly from said trough to the upper extremity of said hopper; said conveying means having an endless movable member and a series of generally flat flight blades secured transversely to said member for movement therewith; said flight blades extending outwardly from said member and aligned over said trough, and having a portion extending into said trough to be moved therewithin; said conveying means including a chain engaging sprocket assembly at the lower portion of said endless movable member and comprising a central drive sprocket and at least one adjacent chain drive sprocket, said central drive sprocket constituting a means for receiving motion from the conveyor chain and transferring it to the endless movable member through said adjacent chain drive sprocket, the flight blades passing lengthwise through the said trough at a speed greater than at least certain portions of the feed therein; said flight blades when moved within said trough gathering feed from said certain portions thereof; and said conveying means then carrying the gathered feed upward to deposit same into the said hopper.

7. The apparatus of claim 6, wherein said means for driving the movable member and flight blades includes: a first rotary member engageable with and driven by the automated apparatus which moved feed in the trough; a second rotary member secured relative to said first rotary member for rotation in unison therewith and having a smaller rotational radius than the first member; and said movable conveying member entrained over said second rotary member to be moved thereby.

8. The apparatus of claim 6, wherein said conveying means includes an inclined housing structure having a bottom portion; wherein said flight blades are positioned at an acute angle relative to said bottom of the inclining housing, in the direction of motion of said movable member; and wherein said housing has an opening therein through which said feed may drop into the hopper; said acute angle facilitating the complete movement of feed away from said flight blades and housing through said opening.

9. The apparatus of claim 7, wherein said conveying means includes an inclined housing structure having a bottom portion; wherein said flight blades are positioned at an acute angle relative to said bottom of said inclining housing in the direction of motion of said movable member; and wherein said housing has an opening therein through which said feed may drop into the hopper; said acute angle facilitating the complete movement of feed away from said flight blades and housing through said opening.

10. The apparatus of claim 9, further including means associated with said inclined housing structure and said movable member for adjusting the tension of the latter.

11. The apparatus of claim 7, wherein said conveying means includes a pair of generally adjacent endless movable members, each having such flight blades secured thereto; wherein a pair of said second rotary members are secured relative to said first rotary member for rotation in unison therewith; said first rotary member being disposed generally centrally of said pair of second rotary members; and wherein each of said movable members is entrained over one of said pair of second rotary members.

12. The apparatus of claim 11, wherein said conveying means includes an inclined housing structure; wherein said flight blades on each of said movable members are positioned at an acute angle relative to said bottom of said inclining housing, in the direction of motion of said movable members; and wherein said housing has an opening therein through which said feed may drop into the hopper; said acute angle facilitating the complete movement of feed away from said flight blades and housing through said opening.

13. The apparatus of claim 12, wherein said apparatus has a total width substantially the same as that of said trough, and further is substantially devoid of any structure projecting laterally therefrom beyond said width.

14. Animal feed return apparatus for transferring feed from the return trough into the supply hopper of automated animal feeding apparatus including a conveyor chain for moving feed through the trough, comprising in combination: a conveying means inclined upwardly from said trough to the upper extremity of said hopper; said conveying means having a housing structure including a floor portion; said housing structure enclosing at least the lower extremity of the conveying means; said conveying means having an endless movable member within said housing structure and a series of flight means secured to said member for movement therewith; said flight means extending outwardly from said member and aligned over said trough, and having a portion extending into said trough to be moved therewithin; said conveying means including a chain engaging sprocket assembly at the lower portion of said endless movable member and comprising a central drive sprocket and at least one adjacent chain drive sprocket, said central drive sprocket constituting a means for receiving motion from the conveyor chain and transferring it to the endless movable member through said adjacent chain drive sprocket, said flight means further interfitting within said housing structure and substantially conforming to said floor portion to provide a movable baffle within the housing; said flight means when moved within said trough gathering feed therefrom and entrapping the feed within said housing; and said conveying means then carrying the gathered and entrapped feed upward within said housing to deposit the feed into the said hopper.

15. The apparatus of claim 14, wherein said apparatus has a total width substantially the same as that of said trough, and further is substantially devoid of any structure projecting laterally therefrom beyond said width.

16. The apparatus of claim 14, wherein said flight means comprise substantially flat blades positioned at an acute angle relative to the said portion of said housing structure, in the direction of motion of said movable member; and wherein said housing has an opening therein through which said feed may drop into the hopper; said acute angle facilitating the complete movement of feed away from said flight blades and housing through said opening.

17. Animal feed return apparatus for transferring feed from the return trough into the supply hopper of automated animal feeding apparatus, including a conveyor chain for moving feed through the trough, comprising in combination: a conveying means inclined upwardly from said trough to the upper extremity of said hopper; said conveying means having a housing structure including a floor portion; said housing structure enclosing at least the lower extremity of the conveying means; said conveying means having an endless movable member within said housing structure and a series of flight means secured to said member for movement therewith; said flight means extending outwardly from said member and aligned over said trough, and having a portion extending into said trough to be moved therewithin; said conveying means including a chain engaging sprocket assembly at the lower portion of said endless movable member and comprising a central drive sprocket and at least one adjacent chain drive sprocket, said central drive sprocket constituting a means for receiving motion from the conveyor chain and transferring it to the endless movable member through said adjacent chain drive sprocket said flight means further interfitting within said housing structure and substantially conforming to said floor portion to provide a movable baffle within the housing; the lowermost extremity of said housing floor portion extending into said trough to obstruct the passage of at least some of the feed being moved therein and accumulated obstructed feed within the trough near said lowermost extremity; the flight means passing lengthwise through the said trough at a speed greater than at least some of said accumulated feed; said flight means when so moved within said trough gathering said accumulated feed therefrom and entrapping the gathered feed within said housing; and said conveying means then carrying the gathered and entrapped feed upward within said housing to deposit the feed into the said hopper.

18. The apparatus of claim 17, wherein said flight means comprise substantially flat blades positioned at an acute angle relative to the said floor portion of said housing structure, in the direction of motion of said movable member; and wherein said housing has an opening therein through which said feed may drop into the hopper; said acute angle facilitating the complete movement of feed away from said flight blades and housing through said opening.

19. The apparatus of claim 17, wherein said conveying means includes a pair of generally adjacent endless movable members, each having such flight blades secured thereto; wherein a pair of said second rotary members are secured relative to said first rotary member for rotation in unison therewith; said first rotary member being disposed generally centrally of said pair of second rotary members; and wherein each of said movable members is entrained over one of said pair of second rotary members.

20. The apparatus of claim 18, wherein said means for driving the movable member and flight means includes: a first rotary member engageable with and driven by the automated apparatus which moves feed in the trough; a second rotary member secured relative to said first rotary member for rotation in unison therewith and having a smaller rotational radius than the first member; and said movable conveying member operatively engaged with said second rotary member to be moved thereby.

21. The apparatus of claim 20, further including means associated with said inclined housing structure and said movable member for adjusting the tension of the latter.

References Cited by the Examiner

UNITED STATES PATENTS

| | | | |
|---|---|---|---|
| 1,186,444 | 6/1916 | Schuhardt | 119—16 |
| 1,607,135 | 11/1926 | Roberts | 131—139 |
| 1,639,758 | 8/1927 | Webb | 198—203 |
| 2,301,084 | 11/1942 | Sinden | 198—168 |
| 2,709,520 | 5/1955 | Stark | 119—52 |
| 2,742,020 | 4/1956 | Smallegan | 119—52 |
| 2,743,827 | 5/1956 | Ballard | 198—203 |
| 2,754,801 | 7/1956 | Reese | 119—52 |
| 2,806,600 | 9/1957 | Bryan et al. | 209—235 |

ALDRICH F. MEDBERY, *Acting Primary Examiner.*